Inventor
HENRY M. BACH

By Herman L. Gordon
Attorney

Feb. 7, 1950

H. M. BACH

TEMPERATURE RESPONSIVE PIEZOELECTRIC CRYSTAL OSCILLATOR 2,496,975

Filed April 17, 1945

3 Sheets-Sheet 2

Inventor
HENRY M. BACH

By Herman L. Gordon
Attorney

Inventor
HENRY M. BACH

By Herman L. Gordon
Attorney

Patented Feb. 7, 1950

2,496,975

UNITED STATES PATENT OFFICE 2,496,975

TEMPERATURE RESPONSIVE PIEZO-ELECTRIC CRYSTAL OSCILLATOR

Henry M. Bach, Lawrence, N. Y., assignor to Premier Crystal Laboratories, Incorporated, New York, N. Y.

Application April 17, 1945, Serial No. 588,877

5 Claims. (Cl. 250—36)

This invention relates to control circuits, and more particularly to temperature-responsive control circuits.

A main object of this invention is to provide a novel and improved method and apparatus for controlling the operation of electrical equipment as a function of temperature change.

A further object of this invention is to provide increased sensitivity in temperature-responsive control circuits.

A still further object of this invention is to provide a method and means for obtaining sharp control circuit performance where it is desired to energize or deenergize equipment at accurately predetermined ambient temperatures or over closely specified temperature ranges.

A still further object of this invention is to eliminate overlapping temperature response characteristics such as are inherent in the use of conventional thermostat devices when employed as temperature responsive elements in temperature-controlled circuits.

A still further object of the invention is to provide a temperature-responsive element adapted for use in a temperature-controlled circuit, said temperature responsive element having accurately preset temperature response characteristics which are very sharp, which are positive in operation and which are accurately repeatable regardless of the direction of temperature change.

A still further object of the invention is to provide an improved adjustable temperature-responsive element for use in temperature controlled electrical circuits which is extremely stable and dependable as to its temperature response characteristics.

Further objects and advantages of the invention will appear from the following description and claims, and from the accompanying drawings, wherein:

Figure 1:
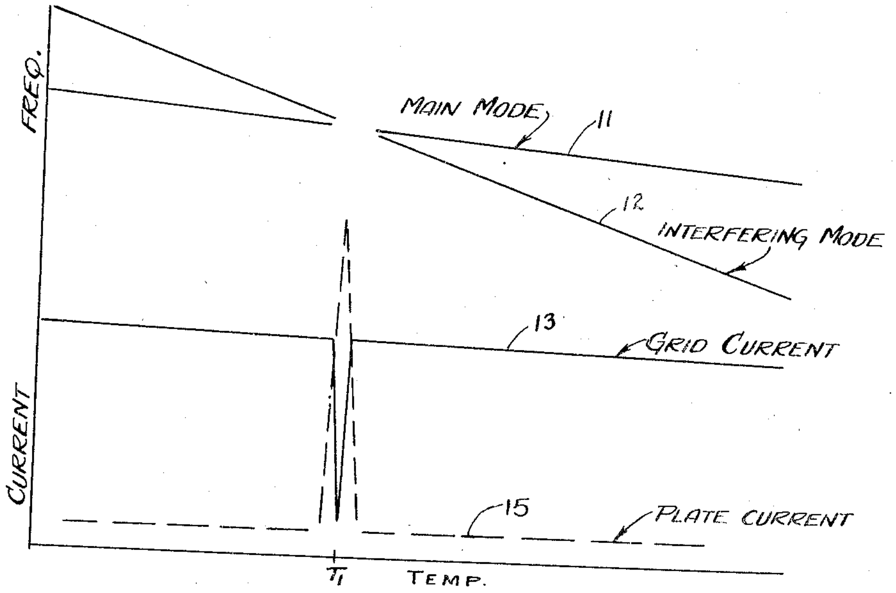
Figure 1 is a set of curves illustrating the temperature characteristics of a piezo-electric oscillator plate employed as a temperature responsive element in accordance with this invention.

In controlling equipment for actuation at a certain desired temperature or over a specific temperature range it is highly important that a sharp response characteristic be present in the temperature responsive element of the control equipment and that the performance of said element be accurately repeatable over long periods of time, after numerous cycles of operation, and regardless of in which direction the temperature change which produces the response occurs. Conventional thermostats give, as a general rule, only approximations of satisfactory performance in the above respects. In the ordinary bimetal thermostatic switch thermal lag in the bimetallic element, fatigue in the metal structure, and corrosion of the contacts are factors contributing to the inaccurate performance of the device. Other types of mechanical temperature responsive switch devices or expansible fluid switch devices as employed in the art are characterized by similar defects.

It is a prime purpose of this invention to provide a temperature responsive control device which utilizes the well known stability of performance and permanency of mechanical characteristics of a piezo-electric-quartz crystal or other piezo-electric crystal having generically similar characteristics.

In the usual design procedure employed in fabricating crystal oscillator plates for use in radio transmitters a prime desideratum has been to avoid or control temperature dips in crystal activity over the working temperature range of the equipment. In designing the plate information must be obtained as to the presence or proximity of mechanically coupled modes of vibration which may interfere with the main mode of vibration at certain points within the working temperature range and cause discontinuities in the oscillation of the crystal and concurrent dips in activity. When this information has been obtained, as by a trial temperature run or by other methods, the dimensions of the plate may be changed, or the plate may be otherwise treated, to move the interfering modes out of the temperature region of possible interference with the main mode. By similar methods it is obviously possible to so design the plate that an interfering mode, or a plurality of interfering modes may be caused to interfere with the main mode at desired points over the temperature range and that activity dips or discontinuities of oscillation of the crystal may be thus caused to occur at said desired points. For a plate thus designed, the performance of the plate will be permanently established and said performance will be faithfully repeated over long periods of time and will be accurately reproduced regardless of which direction the change in temperature which produces the interference of the modes occurs.

Once the set of interfering modes have been designed into the plate it is possible to shift the points of interference in either direction with respect to temperature by varying the input reactance of the plate. A simple means for adjusting the point of temperature response consists of a small variable condenser shunted across the crystal. By varying the shunt capacity the point of interference of the modes may be shifted a substantial number of degrees in either direction.

Figure 2:
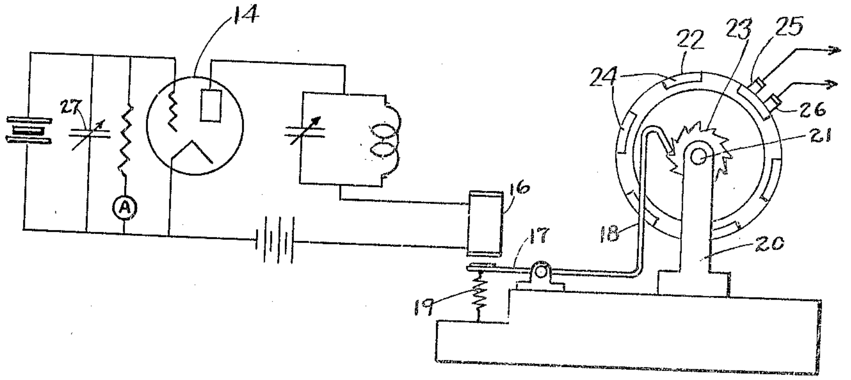
Figure 2 is a schematic diagram of a temperature responsive circuit wherein a quartz crystal is employed as the temperature responsive element.

Referring to the drawings, Figure 1 shows the general temperature characteristics of a plate having an interfering mode producing a discontinuity of oscillation at a temperature $T_1$, the plate being connected in a conventional tuned-plate oscillator circuit such as shown in Figure 2. In Figure 1, 11 designates the frequency-temperature characteristic of the main mode and 12 designates the frequency-temperature characteristic of the interfering mode. The crystal "activity" is represented by the curve 13, said curve representing the rectified grid current values of the oscillator tube 14 in Figure 2 over the temperature range. It can be seen that the grid current drops sharply at the point of interference of the modes at the temperature value $T_1$. The dotted line 15 in Figure 1 represents the oscillator tube plate current, which, as can be seen in Figure 1, rises sharply at the point of discontinuity of oscillations corresponding to temperature $T_1$.

In the structure shown diagrammatically in Figure 2, a solenoid 16 is connected in series with the tube plate circuit, said solenoid being adapted to be energized by a rise in plate current, such as occurs at $T_1$, to raise an armature 17, said armature being pivotally mounted on an appropriate support and carrying a resilient upwardly extending pawl arm 18. A spring 19 biases armature 17 to a normal depressed position.

Pivotally mounted on an appropriate support 20 is a shaft 21 carrying rigidly secured thereto a commutator drum 22 and a ratchet wheel 23. Commutator drum 22 carries peripherally positioned thereon a spaced series of arcuate conductive elements 24 separated by equal arcuate lengths of insulating material and appropriately insulated from the remaining commutator structure. A pair of appropriate brushes 25 and 26 are positioned by conventional spring mountings so as to be at times bridged by conductive elements 24 and at all times to exert light frictional pressure against the periphery of the commutator drum. Brushes 25 and 26 are connected to the temperature controlled circuit.

Pawl arm 18 is formed to actuate ratchet wheel 23 to rotate drum 22 through an angle corresponding to the arcuate length of elements 24 responsive to the raising of armature 17 by solenoid 16. Upon release of armature 17, spring 19 moves the armature and resilient pawl arm 18 back to normal position, drum 22 being held in its rotated position by the frictional pressure of brushes 25 and 26 until solenoid 16 is again actuated. Since contact across brushes 25 and 26 is alternately made and broken by each rotation of drum 22 by solenoid 16, it can be readily seen that the temperature controlled circuit will always be positively closed at one side of temperature $T_1$, and always be positively opened at the other side of said temperature. It is also readily apparent that substantially no thermal lag exists in the device as such. The external thermal inertia effects may be minimized by mounting the crystal in a hermetically sealed metal holder filled with gas of high thermal conductivity and employing an exposed grounded wall of the holder as a crystal electrode. Said exposed wall may be positioned in any well known manner so as to be readily influenced by fluctuations in ambient temperature.

As shown in Figure 2, a variable shunt condenser 27 may be employed to vary the point of temperature response $T_1$. The condenser 27 may be of any conventional type having a range of adjustment sufficient to adjust the frequency of the oscillator to a desired proximity thereof to the coupling frequency of the crystal. Ordinarily, the range required would be obtained by using an adjustable padder condenser such as is commonly employed in radio receivers. Said shunt condenser may be provided with a pointer device mounted on its shaft and a scale suitably calibrated in degrees of temperature so that the device may be set to close or open the control circuit above or below a predetermined value of ambient temperature.

Figures 3, 4:
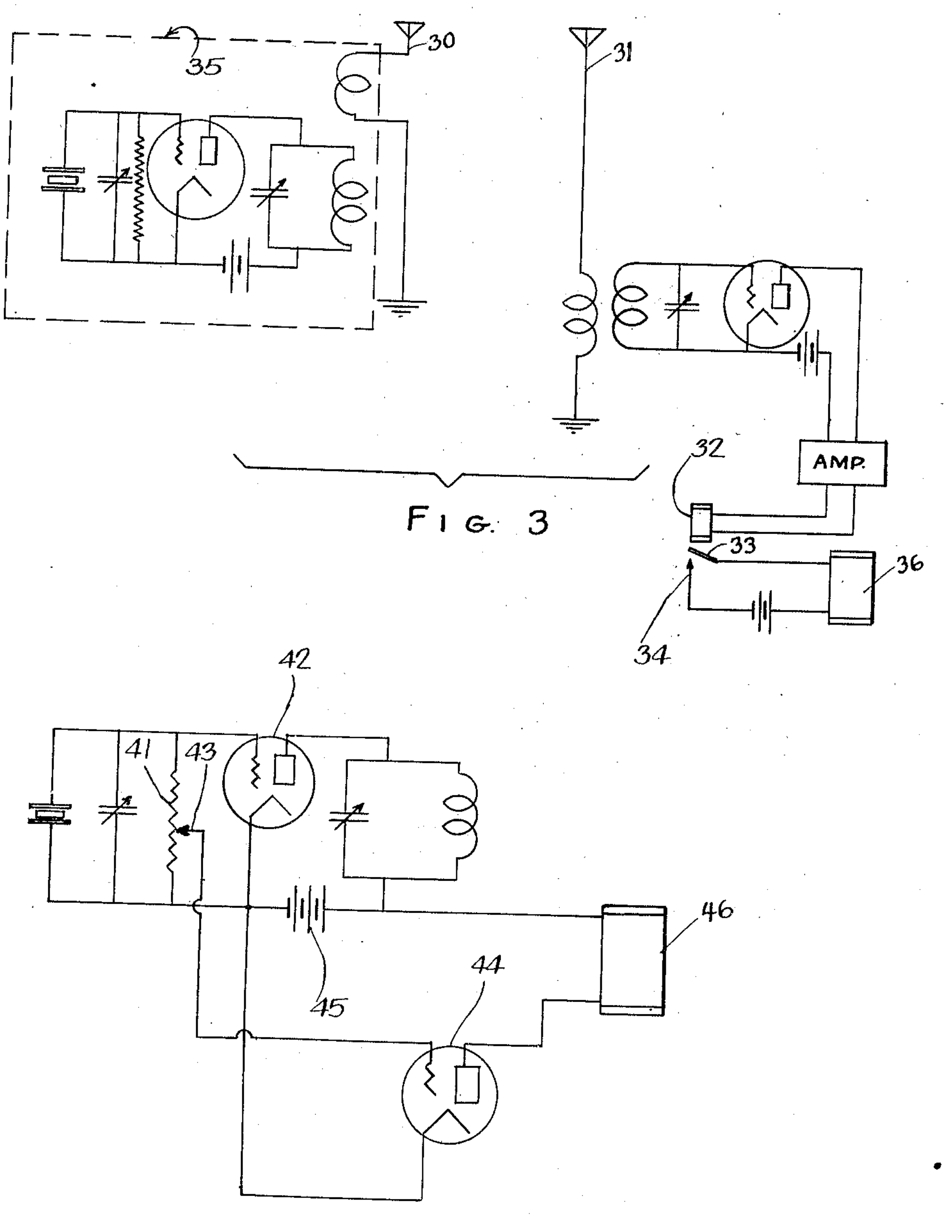
Figure 3 is a diagrammatic view of temperature responsive apparatus according to this invention arranged for remote wireless control of equipment as a function of temperature at a control station.
Figure 4 is a schematic circuit diagram representing a modification of the temperature responsive circuit of Figure 2.

In Figure 3 a remote control arrangement is disclosed whereby the operation of equipment remote from a temperature responsive element may be controlled in accordance with the ambient temperature at element 35. In this embodiment the temperature responsive element 35 comprises a crystal having characteristics such as shown in Figure 1 employed in a conventional oscillator circuit coupled to an antenna 30 which normally radiates radio frequency energy to a remote receiving antenna 31. The energy received by antenna 31 is amplified by conventional means and maintains a solenoid 32 in an energized condition. Solenoid 32 thus normally maintains its armature 33 in a raised position with respect to a contact 34 and open-circuits the energizing circuit for a solenoid 36 which is similar in all respects to solenoid 16 in Figure 2 and has associated therewith the armature ratchet and commutator means of Figure 2.

When the control temperature $T_1$ is reached at the temperature responsive element 35, the amplitude of the radio frequency energy radiated by antenna 30 drops sharply causing a corresponding drop in the amplitude of the current in solenoid 32 at the receiving station. Armature 33 is released, closing the energizing circuit for main solenoid 36 and producing a rotation of its associated commutator to thereby perform a control operation with respect to the controlled circuit in the same manner as in the embodiment of Figure 2.

In Figure 4 a variation of the crystal circuit of Figure 2 is employed wherein the energization of the main solenoid 46 is responsive to the decrease of rectified grid current in the crystal oscillator tube at the coupling temperature $T_1$. In Figure 4 a grid leak 41 is shunted across the grid and cathode of the crystal oscillator tube 42, an adjustable contact 43 being provided on said grid leak, said contact being connected to the grid of a triode 44. The cathode of triode 44 is connected to the cathode of oscillator tube 42. The plate of triode 44 is connected to one terminal of the main solenoid 46, the other terminal being connected to the positive terminal of a plate battery 45.

When the crystal is oscillating normally rectified grid current flows through leak 41 so that the grid of triode 44 is at a substantial negative potential with respect to its cathode and substantially no plate current flows in the plate circuit of triode 44, which includes solenoid 46. When the coupling temperature $T_1$ is reached, the rectified grid current through leak 41 drops sharply. This reduces the potential between contact 43 and the cathode terminal of leak 41. The negative bias is substantially reduced on the grid of triode 44. This allows considerable plate current to flow in triode 44 and energizes solenoid 46, causing the actuation of its associated commutator element to thereby perform a control operation on the controlled circuit.

Figures 5, 6:
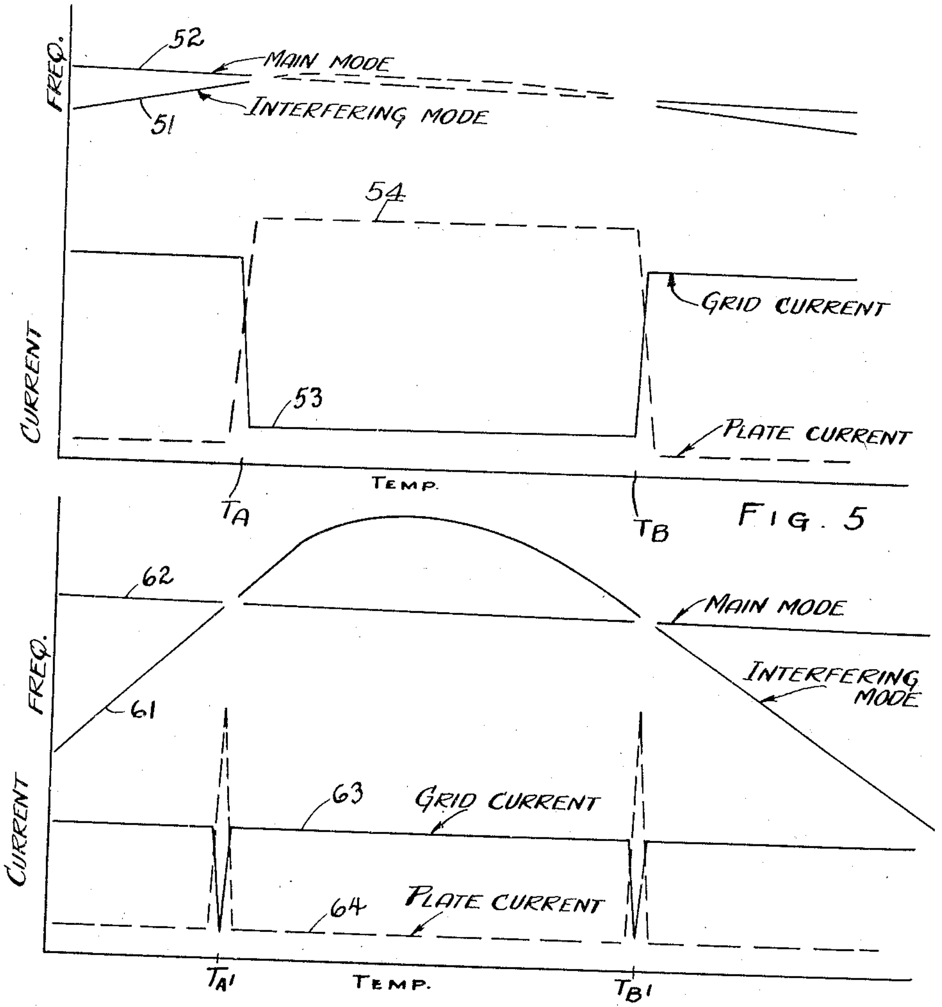
Figure 5 is a set of curves illustrating the temperature response characteristics of a piezo-electric oscillator plate designed for cut-off over a predetermined temperature range.
Figure 6 is a set of curves illustrating the temperature response characteristics of a piezo-electric oscillator plate designed for response at two predetermined points over a range of temperatures.
Figure 7:
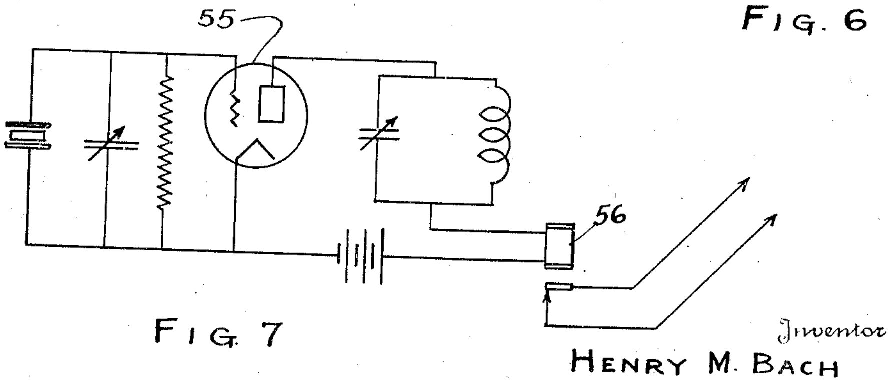
Figure 7 is a schematic circuit diagram of a temperature responsive circuit employing the crystal of Figure 5.

In Figure 5 a set of characteristics for a crystal having a coupled mode effective to suppress the main mode over a substantial temperature band is disclosed. The frequency-temperature characteristic 51 of the coupled mode approaches the frequency-temperature characteristic 52 of the main mode and continuously couples therewith from a lower temperature value $T_A$ to an upper temperature value $T_B$. This produces a region of suppressed activity as shown by the rectified grid current characteristic 53 and the oscillator tube plate current characteristic 54. Such a crystal, when employed in the circuit of Figure 7 will be effective to directly control a desired circuit for energization or deenergization over the band of temperatures between $T_A$ and $T_B$. As shown in Figure 7, a solenoid 56 is connected in the plate circuit of the crystal oscillator tube 55 with its armature contacts arranged to maintain the controlled circuit open between temperature $T_A$ and temperature $T_B$.

A result similar to that obtained by the circuit of Figure 7 when employing the crystal of Figure 5 may be obtained by employing in the circuit of Figure 2 or 4 a crystal having the characteristics of Figure 6. In Figure 6 the frequency-temperature characteristic 61 of the coupled mode intersects the frequency temperature characteristic 62 of the main mode at a first temperature $T_{A1}$ and at a second temperature $T_{B1}$. Coupling occurs at both temperatures with resultant discontinuities at said coupling temperatures, as shown by the dips in the rectified grid current characteristic 63 and the sharp peaks in the oscillator tube plate current characteristic 64 at said coupling temperatures.

In Figure 6, a crystal having separate coupling modes may be employed to produce the spaced discontinuities instead of employing a single coupling mode having the curved characteristic therein shown.

Although the specific embodiments illustrative of the invention herein disclosed operate substantially as a result of discontinuities in oscillation caused by the interfering modes, it is obvious that actual discontinuities need not be relied on and that the operation may be obtained as a result of mere coupling of the interfering modes sufficient to produce distinct changes in current in the oscillator circuit control devices, or in the amplitude of the oscillations where radiated energy is employed. For example, the coupled modes may produce changes in circuit current to actuate an indicating needle or a recording pen to provide a temperature indication based upon the proximity of the coupling modes at an instantaneous temperature. Other devices which are to be operated in a graduated manner in accordance with temperature changes may obviously be substituted for the current-responsive indicators.

The oscillators disclosed in the various figures are well known per se, and the details thereof form no part of the present invention. For detailed information regarding this type of oscillator reference is made to "Radio Engineer's Handbook," by F. E. Terman, McGraw-Hill Book Company, New York, 1943, page 495, "Piezoelectricity" by W. G. Cady, McGraw-Hill Book Company, New York, 1946, pages 493 and 495, and "Radio Amateur's Handbook," special defense edition, American Radio Relay League, Inc., West Hartford, Conn., 1942, page 62. Also see U. S. Patent 1,789,496 to G. W. Pierce and U. S. Patent 1,756,000 to J. M. Miller.

Furthermore, other known circuits than those disclosed herein for vibrating the crystal may be employed within the contemplation of the invention.

While certain specific embodiments of temperature responsive control devices and methods have been disclosed in the foregoing description it will be understood that various modifications within the spirit of the invention may occur to those skilled in the art. Therefore it is intended that no limitations be placed on the invention other than as defined by the scope of the appended claims.

What is claimed is:

1. Means for controlling the operation of electrical equipment in accordance with changes in temperature, comprising a piezo-electric vibratory element, means for maintaining the equipment in a first condition when said vibratory element is vibrating in a first mode of vibration, said vibratory element having a second mode of vibration adapted to couple with said first mode in a predetermined manner responsive to changes in temperature, means for presetting the coupling temperature comprising a variable condenser calibrated in degrees of temperature connected across said vibratory element, and means responsive to the coupling of said second mode to said first mode for transferring the equipment from said first condition to a second condition.

2. Means for controlling the operation of an electrical device in accordance with changes in temperature, comprising a tuned plate oscillator having a crystal connected in its grid circuit whereby the crystal operates as the frequency control means for the oscillator, said crystal having a main mode and a secondary mode adapted to interfere with the main mode and suppress oscillations responsive to a predetermined temperature condition and input reactance condition of said crystal, means connecting the device to the plate circuit of the oscillator, and a variable impedance calibrated in degrees of temperature connected to said grid circuit and adapted to selectively vary the input reactance of the crystal to thereby vary the temperature condition at which interference between the modes will take place.

3. Means for controlling the operation of electrical equipment in accordance with changes in temperature, comprising a vibratory piezo-electric element, means for maintaining the equipment in a first condition when said vibratory piezo-electric element is vibrating in a first mode of vibration, said vibratory piezo-electric element having a second mode of vibration adapted to couple with said first mode in a predetermined manner responsive to changes in temperature, a variable capacitance calibrated in degrees of temperature connected across said piezo-electric element for pre-setting the coupling temperature, and means responsive to the coupling of said second mode to said first mode for transferring the equipment from said first condition to a second condition.

4. Means for controlling the operation of an electrical device in accordance with changes in temperature, comprising an oscillator having a piezo-electric vibratory element as its frequency control means, said vibratory element having a first mode of vibration and a second mode of vibration adapted to interfere with said first mode to suppress vibration responsive to a predetermined temperature condition and input reactance condition of said vibratory element, means connecting the oscillator to the device, and means for selectively varying the input reactance of the vibratory element to thereby vary the temperature condition at which interference between the modes will take place, said last named means comprising a variable condenser calibrated in degrees of temperature and connected across said vibratory element.

5. Means for controlling the operation of an electrical device in accordance with changes in temperature, comprising a piezo-electric vibratory element, means for maintaining the device in a first condition when said vibratory element is vibrating in a first mode of vibration, said vibratory element having a second mode of vibration adapted to couple with said first mode in a predetermined manner responsive to changes in temperature, a variable condenser connected across said piezo-electric element for pre-setting the coupling temperature, said condenser including a movable portion carrying a pointer device and a relatively stationary scale calibrated in degrees of temperature, and means for transferring the device from said first condition to a second condition responsive to the coupling of said second mode to said first mode.

HENRY M. BACH.

REFERENCES CITED

The following references are of record in the file of this patent:

UNITED STATES PATENTS

| Number | Name | Date |
|---|---|---|
| 1,789,369 | Meissner | Jan. 20, 1931 |
| 1,912,213 | Nicolson | May 30, 1933 |
| 1,958,620 | Hersing | May 15, 1934 |
| 1,975,812 | Wallace | Oct. 9, 1934 |
| 1,994,228 | Osnos | Mar. 12, 1935 |
| 1,996,737 | Bechman | Apr. 9, 1935 |
| 2,054,659 | Osnos | Sept. 15, 1936 |
| 2,056,285 | Machlet | Oct. 6, 1936 |
| 2,137,304 | Parkin | Nov. 22, 1938 |
| 2,171,243 | McKesson | Aug. 29, 1939 |
| 2,277,692 | Dunmore | Mar. 31, 1942 |
| 2,306,555 | Mueller | Dec. 29, 1942 |

FOREIGN PATENTS

| Number | Country | Date |
|---|---|---|
| 7,807 of 1932 | Australia | June 13, 1933 |
| 509,866 | Great Britain | July 24, 1929 |
| 295,957 | Great Britain | Aug. 17, 1928 |